(12) United States Patent
Griffin et al.

(10) Patent No.: US 11,070,378 B1
(45) Date of Patent: Jul. 20, 2021

(54) SIGNCRYPTED BIOMETRIC ELECTRONIC SIGNATURE TOKENS

(71) Applicant: Wells Fargo Bank, N.A., San Francisco, CA (US)

(72) Inventors: Phillip H. Griffin, Raleigh, NC (US); Jeffrey J. Stapleton, Arlington, TX (US)

(73) Assignee: Wells Fargo Bank, N.A., San Francisco, CA (US)

( * ) Notice: Subject to any disclaimer, the term of this patent is extended or adjusted under 35 U.S.C. 154(b) by 308 days.

(21) Appl. No.: 15/345,111

(22) Filed: Nov. 7, 2016

(51) Int. Cl.
*H04L 9/32* (2006.01)

(52) U.S. Cl.
CPC .......... *H04L 9/3247* (2013.01); *H04L 9/3231* (2013.01); *H04L 9/3236* (2013.01); *H04L 9/3297* (2013.01); *H04L 2209/72* (2013.01); *H04L 2463/121* (2013.01)

(58) Field of Classification Search
CPC ....... H04L 9/32; H04L 9/3231; H04L 9/3247; H04L 2209/72; H04L 9/3236; G06Q 20/38–389; G06Q 20/40145
See application file for complete search history.

(56) References Cited

U.S. PATENT DOCUMENTS

| | | | | |
|---|---|---|---|---|
| 6,553,494 B1 * | 4/2003 | Glass | ....................... | G06F 21/32 713/176 |
| 8,108,678 B1 * | 1/2012 | Boyen | ................... | H04L 9/0847 713/176 |
| 2010/0205452 A1 * | 8/2010 | Griffin | .................. | H04L 9/3231 713/186 |
| 2010/0205660 A1 * | 8/2010 | Griffin | .................... | G06F 21/32 726/6 |
| 2010/0250944 A1 * | 9/2010 | Suzuki | ................ | H04L 63/0861 713/172 |
| 2013/0283035 A1 * | 10/2013 | Tomlinson | ............ | H04L 9/3247 713/150 |
| 2016/0203496 A1 | 7/2016 | Guerrero et al. | | |
| 2016/0330027 A1 | 11/2016 | Ebrahimi | | |

(Continued)

OTHER PUBLICATIONS

Sangeetha, S.K.B. & Jayalakshmi, S.L., Signcryption Approaches for Network Security, Int'l J. Sci. & Eng. Rsch, vol. 6, Issue 5, May 2015.*

(Continued)

*Primary Examiner* — Daniel B Potratz
*Assistant Examiner* — D'Arcy Winston Straub
(74) *Attorney, Agent, or Firm* — Foley & Lardner LLP

(57) ABSTRACT

The methods and system allow for the generation of a signcrypted biometric electronic signature token using a subsequent biometric sample after an enrollment of a biometric reference value in a biometric system. The signcrypted biometric electronic signature token involves simultaneous encryption and digital signature to protect the confidentiality. The system as described herein provides data integrity, origin authentication, and efficiency by performing encryption and digital signature simultaneously. The process allows a signcrypting party to enroll in a biometric service, sign a piece of data or content using a public key, that may be tied to a trusted anchor certificate authority, and submit a biometric sample. Subsequently, the relying party may validate the information on that piece of data or content to confirm the identity of the signcrypting party.

22 Claims, 5 Drawing Sheets

(56) References Cited

U.S. PATENT DOCUMENTS

2017/0140408 A1*  5/2017  Wuehler .............. G06Q 30/0207
2017/0221052 A1*  8/2017  Sheng ................. G06Q 20/3829
2018/0373859 A1* 12/2018  Ganong ................. G06F 21/32

OTHER PUBLICATIONS

Griffin, Phillip; Signcryption Information Assets; Jun. 2012; ISSA Journal-33; p. 1 (Year: 2012).*
Griffin, Phillip, Signcryption Information Assets, ISSA Journal, Jun. 2012, p. 33-37 (Year: 2012).*
Griffin, Phillip, Signcryption for Biometric Security, Journal of Cyber Security and Information Systems, 1-1, Oct. 2012, p. 6-9 (Year: 2012).*
Sangeetha, S. & Jayalakshmi, S, Signcryption Approaches for Network Security, International Journal of Scientific & Engineering Research, vol. 6, Issue 5, May 2015, p. 19-23 (Year: 2015).*
Idelberger, F. et al., Evaluation of Logic-Based Smart Contracts for Blockchain Systems, Jun. 28, 2016, Springer Int'l Pub., p. 167-183 (Year: 2016).*
American National Standard for Financial Services, Cryptographic Message Syntax—ASN.1 and XML, ANSI X9.73/2010, Apr. 15, 2010. 89 pages.
American National Standard for Financial Services, Trusted Time Stamp Management and Security, ANSI X9.95/2011. 150 pages.
BSI Standards Publication, Information Technology—Security Techniques—Signcryption, BS ISO/IEC 29150:2011. 64 pages.
Griffin, Phillip, "Protecting Biometrics Using Signcryption", ID306: The Global Forum on Identity, Apr. 23-24, 2012, The Center for Identity—University of Texas at Austin. 8 pages.
Griffin, Phillip, "Signcryption for Biometric Security", Journal of Cyber Security and Information Systems 1-1, Oct. 2012. 4 pages.
Griffin, Phillip, "Signcryption Information Assets", ISSA Journal-33, Jun. 2012. 5 pages.
International Telecommunication Union, Series X: Data Networks, Open System Communications and Security Directory, ITU-T, X.509, Oct. 2012. 208 pages.

* cited by examiner

SIGNCRYPTED BIOMETRIC ELECTRONIC SIGNATURE TOKENS

BACKGROUND

As computer-based technologies have evolved, conventional in-person and paper-based transactions and communications are increasingly performed electronically over networks (e.g., the internet). Although electronic communications have significantly reduced costs and improved efficiencies, they pose significant risks regarding identification and authentication of signing parties, integrity of data, and confidentiality.

An electronic signature ("e-signature") refers to data in electronic form that is associated with a record and that is used by a signatory or signcrypting party to sign the record. An e-signature is intended to provide a secure and accurate identification method for the signatory to provide a seamless transaction to a relying party. Definitions of e-signatures vary depending on the applicable jurisdiction. For example, the United States is governed under the Electronic Signatures in Global and National Commerce Act ("ESIGN") and the Government Paperwork Elimination Act ("GPEA"). Under the ESIGN an e-signature is defined as an electronic sound, symbol, or process, attached to or logically associated with a contract or other record and executed or adopted by a person with the intent to sign the record. Additionally under United States federal law, the GPEA further defines the term "electronic signature" to mean a method of signing an electronic message that: (A) identifies and authenticates a particular person as the source of the electronic message; and (B) indicates such person's approval of the information contained in the electronic message. Increasingly, digital signatures are used in e-commerce and in regulatory filings to implement electronic signature in a cryptographically protected way.

Digital signatures are mathematical schemes for demonstrating the data integrity and origin authenticity of digital messages or electronic documents. A variety of cryptographic techniques are used to encrypt data and to create digital signatures. With symmetric key cryptographic systems, a pair of users who desire to exchange data securely use a shared "symmetric" key. With this type of approach, a sender of a message uses the same key to encrypt the message that a recipient of the message uses to decrypt the message. Symmetric key systems require that each sender and recipient establish the shared key in a secure manner. Public key systems may also be used to exchange messages securely. With public-key cryptographic systems, two types of keys are used—public keys and private keys. A sender of a message may encrypt the message using the public key of a recipient. The recipient may use a corresponding private key to decrypt the message.

Additionally, public key cryptographic systems (e.g., asymmetric key cryptographic systems) may be used to produce digital signatures. A recipient of a message that has been digitally signed can use the digital signature to verify the identity of the message sender and to confirm that the message has not been altered during transit. In a typical digital signature arrangement, a sender uses a cryptographic hash function to produce a message digest. The message digest is much smaller than the original message, but is still relatively unique to the message. The sender then uses its key to generate the digital signature using the message digest. The process of signing the message uses a mathematical operation that can only be performed by the sender who possesses the private key. The message and the "digital signature" can then be sent to a recipient. As will be appreciated, the recipient (e.g., the relying party) is an entity that can use the digital signature and the message sender's public key (e.g., encapsulated in a certificate) to determine that the sender is the message signer and that the integrity and origin authenticity of the message has not been compromised.

Biometrics can be used for human identification and verification for physical and logical access. Physical access can include admittance to buildings, rooms, or secure locations. Logical access can include logging in to applications or services, or enabling entitlements. Authentication systems require that the party that wishes to be authenticated has enrolled a biometric reference template at a biometric service provider ("BSP") or similar entity. A biometric reference template is a digital reference of an individual's distinct characteristics obtained by processing one or more biometric samples from the individual. Biometric traits may include, for example, biological (e.g., fingerprint, iris, hand geometry, etc.) and behavioral (e.g., gait, gesture, keystroke dynamics, etc.) characteristics that reliably distinguish one person from another. Digital representations of these characteristics are stored in an electronic medium as a reference template, and later used to authenticate the identity of an individual who provides a subsequent biometric sample.

Today, information is more to be accessed by individuals from a cloud-based system using mobile and wireless devices. These devices may be personally owned, outside of the administrative control of an organization, and immune to its security and privacy policies. If these devices are lost or stolen, it may not be possible for an organization to erase the business critical information they might contain, such as customer and supplier contacts, bid and proposal data, or intellectual property. These factors all increase risk to the organization and its business-critical and sensitive information. While greater mobility and access to information from anywhere are benefits of using personally-owned mobile devices, there is a growing concern and need for data protection as organizations rely on public networks to exchange and access sensitive information, for example, biometrics. As transactions, interactions, and communications occur over various internet-centric services, the protection of personally identifiable information ("PII") needs to be efficient and effective, providing assurance of the identity of the party while not compromising any sensitive information or slowing down information exchange processes with heavy (e.g., processor-intensive) protection mechanisms.

SUMMARY

Various embodiments relate to a method performed by a processor of a computing system. An example method includes receiving a biometric sample captured from a signcrypting party. Each of a record and the biometric sample is signcrypted using each of a signcrypting party public/private key pair associated with the signcrypting party, and a recipient public key of a recipient public/private key pair. A signcrypted biometric electronic signature token ("SBEST") is generated. The digital signature of the SBEST can be verified using each of the recipient public/private key pair and the signcrypting party public key. The signcrypting party's identity can be authenticated by matching the biometric sample recovered from the SBEST with a biometric reference template associated with the signcrypting party.

Various embodiments relate to a method performed by a processor of an authentication computing system. The authentication computing system includes a storage location comprising a plurality of biometric reference templates and a processor and instructions stored in non-transitory machine-readable media. The instructions are configured to cause the server system to receive a biometric sample captured from a signcrypting party. Each of a record and the biometric sample is signcrypted using each of a signcrypting party public/private key pair associated with the signcrypting party, and a recipient public key of a recipient public/private key pair. A signcrypted biometric electronic signature token is generated. The digital signature of the SBEST can be verified using each of the recipient public/private key pair and the signcrypting party public key. The signcrypting party's identity can be authenticated by matching the biometric sample recovered from the SBEST with a biometric reference template associated with the signcrypting party.

Various other embodiments relate to a method performed by a processor of a biometric service provider computing system. The method includes enrolling a biometric template of a user. Enrolling includes receiving a biometric reference sample captured from the user and generating a biometric reference template based on biometric characteristics extracted from the biometric reference sample. The biometric reference template is associated with a unique user identifier. The biometric reference template is stored with the associated unique user identifier. An electronic signature is generated. The electronic signature includes associating a record with the electronic signature. A signcrypting party asymmetric key is generated. The signcrypting party asymmetric key includes a signcrypting party public and a signcrypting party private key pair. A biometric sample captured from a user is received. The biometric sample is time stamped via a time stamp token. A recipient public key of a recipient public/private key pair is retrieved. Each of a record and the biometric sample is signcrypted using each of a signcrypting party public/private key pair associated with the signcrypting party, and a recipient public key of a recipient public/private key pair. A signcrypted biometric electronic signature token is generated. The digital signature of the SBEST can be verified using each of the recipient public/private key pair and the signcrypting party public key. The signcrypting party's identity can be authenticated by matching the biometric sample recovered from the SBEST with a biometric reference template associated with the signcrypting party.

Various other embodiments relate to a method performed on a computing system. The method includes receiving a signcrypted biometric electronic signature token. The SBEST includes a signcrypted first biometric sample captured from a user and a record. The signcrypting party public and private key pair, and a recipient public key are used to generate the SBEST. The SBEST is verified. A second biometric sample captured from the user is received. A biometric reference template based on biometric characteristics extracted from the second biometric sample is generated The identity of the user may be validated by decrypting the first biometric sample and matching the decrypted first biometric sample with the biometric reference template.

Various embodiments relate to a method performed by a processor of a computing system. An example method includes receiving a biometric sample captured from a signcrypting party and a record. An ACCEPT indicator is associated to the biometric sample. The ACCEPT indicator includes an executing condition and the ACCEPT indicator is associated with a remote procedure call. The biometric sample, the record, the ACCEPT indicator and a signcrypt code are stored in a storage location. When the executing condition is achieved the signcrypt code is initiated. Each of a record and the biometric sample is signcrypted using each of a signcrypting party public/private key pair associated with the signcrypting party, and a recipient public key of a recipient public/private key pair. A signcrypted biometric electronic signature token is generated. The digital signature of the SBEST can be verified using each of the recipient public/private key pair and the signcrypting party public key. The signcrypting party's identity can be authenticated by matching the biometric sample recovered from the SBEST with a biometric reference template associated with the signcrypting party.

These and other features, together with the organization and manner of operation thereof, will become apparent from the following detailed description when taken in conjunction with the accompanying drawings, wherein like elements have like numerals throughout the several drawings described below.

Figure 1:
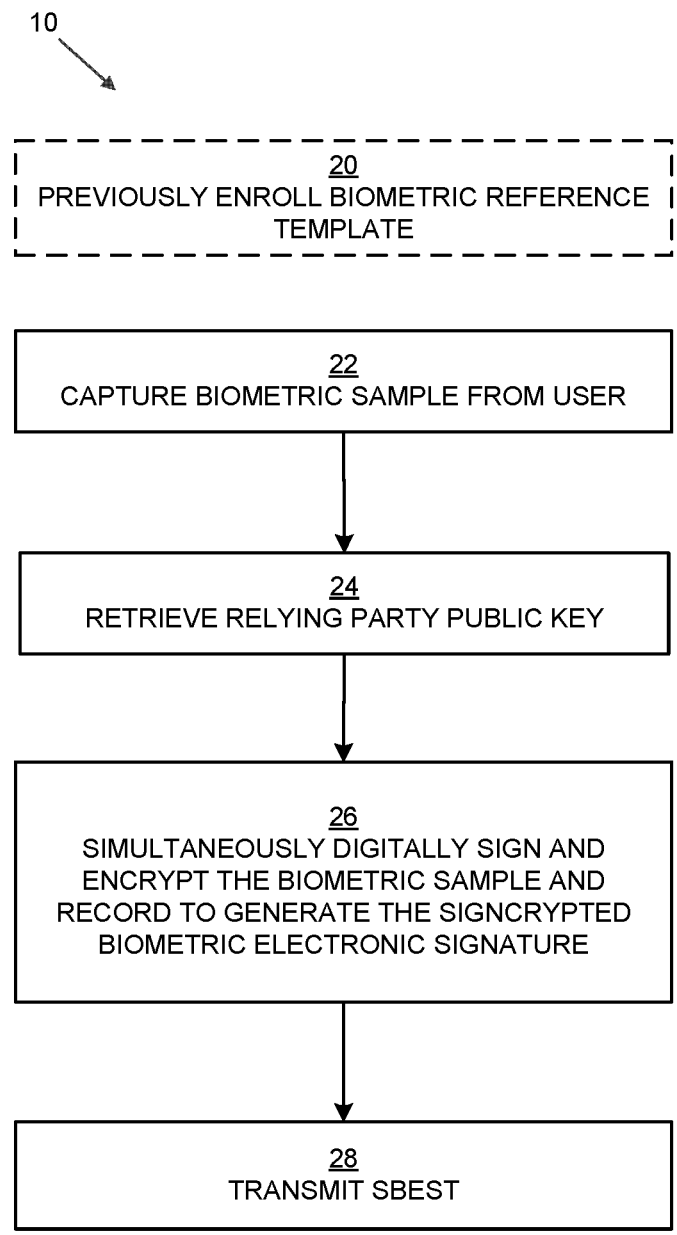
FIG. 1 is a flow diagram illustrating a method of generating a signcrypted biometric electronic signature token, according to an example embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein and illustrated in the figures, can be arranged, substituted, combined, and designed in a wide variety of different configurations, all of which are explicitly contemplated and made part of this disclosure.

DETAILED DESCRIPTION

There is an increasing need for organizations and individuals to securely protect the confidentiality, integrity, and authenticity of their information assets. Consequently, there is an even greater need for security if biometrics or other signcrypting party (e.g., signing party, message signer, user, etc.) PII are provided in a message or interaction, either as a verification of the identity of the sender, as content within the message, or both. On an individual basis, there is a need to protect and secure a biometric sample while maintaining the authenticity and integrity of that sample. On a database level, where a database contains a plurality of biometric samples for a plurality of subscribers, the database must maintain origin authenticity and integrity for these samples.

If not properly secured, databases are susceptible to "Hill-Climbing Attacks," where an unauthorized third-party randomly grabs binary bits in an attempt to generate a match to a biometric sample within the database. Consequently, there is a need for an authentication-based system for internet-centric interactions that provides greater assurance to the protection of identity as well as the veracity of the claimed identity while maintaining the speed, convenience, and efficiency of internet-centric transactions.

Various embodiments described herein relate to systems and methods for a signcrypted biometric electronic signature token ("SBEST") processing system for creating and verifying an SBEST, which is a biometrics-based electronic signature on a record (e.g., a contract, mortgage, business transaction, etc.). According to various embodiments, the SBEST processing system utilizes signcryption to generate an SBEST. Signcryption is a hybrid cryptographic primitive that utilizes an asymmetric encryption scheme and a digital signature scheme combined in a specific way, along with specially developed algorithms to perform both encryption and digital signature functions simultaneously (e.g., signcrypted or signcryption). This efficient cryptographic technique provides data integrity, origin authentication, and data confidentiality in a single operation. Some versions of signcryption algorithms provide non-repudiation. By utilizing signcryption, an SBEST protects the confidentiality and data integrity of the signcrypting party's PII during transfer and storage. The SBEST processing system and an SBEST allows a relying party to validate the information and authenticate the identity of the signcrypting party at a later time, either through verification of a known identity or identification of a matching biometric reference template and user identity.

As will be appreciated, the SBEST processing system may be used to create and verify SBESTs in connection with e-commerce transactions or other types of signing events, such as those involving cloud-based, blockchain-based, distributed ledgers, or smart contract systems, for example. An SBEST provides a signcrypting party (e.g., signing or signcrypting party) with the ability to provide a biometric sample from the signcrypting party and a record, both cryptographically bound (e.g. protected) under a digital signature, thereby providing assurance of the identity of the message (e.g., record) signer to a relying party through signcryption. An SBEST makes use of signcryption to produce a ciphertext (e.g., data that has been transformed by a cryptographic operation to hide its information content) that includes the digital signature and encryption process being combined into a single cryptographic operation. The signcryption algorithm takes as input a plaintext (e.g., a signcrypting party's biometric sample, a record, or other content), a signcrypting party's public and private key pair, a message recipient's public key and any other content or data, performs a sequence of specified operations on the input and outputs ciphertext. Occurring simultaneously with encryption is the digital signature process. Digital signature refers to the process that takes as inputs the message, one or more signature keys, and the domain parameters, and outputs a signature. The resulting output ciphertext of the simultaneous digital signing and encryption is used in a message. An SBEST is the resulting message in the form of a token, such that the SBEST includes elements of content (e.g., biometric, record, symbolic value, etc.) and other implementation specific data (which can be attached as signed attributes). An SBEST is structured such that no information about the original data can be recovered (except possibly its length). The resulting SBEST is such that it cannot be used to generate a new ciphertext by an unauthorized entity without detection from a relying party. The signcrypting party may send an SBEST, for example, in the form of a SigncryptedData message, to a relying party.

A relying party can decrypt an SBEST to access the simultaneously digitally signed and encrypted (e.g., signcrypted) biometric sample and record by using an unsigncryption algorithm associated with the SBEST. The unsigncryption algorithm includes as input the SBEST, a recipient's public and private key pair, a sender's public key and any other data. In some arrangements, the resulting output includes a pair consisting of either a symbolic value "ACCEPT" and a plaintext (e.g., record and biometric sample), or a symbolic value "REJECT" and a null string. When there are any signed attributes, the recipient may also verify the digital signature. Once decrypted, an SBEST provides a relying party with all information needed to verify the digital signature and biometric information of the signcrypting party.

A relying party can verify the signature to provide a "something-you-have" identification factor and can authenticate the identity of the user (e.g., signcrypting party) via the biometric sample to provide a "something-you-are" authentication factor. In some embodiments, the "something-you-have" identification is achieved by performing a path validation on the signer certificate chain back to a trust anchor. In some embodiments, the "something-you-are" identification factor is achieved through a biometric authentication processes including verification or identification. Verification is the process of comparing a biometric match template against a specific biometric reference template based on a claimed identity (e.g., user ID, account number, etc.). Identification is the process of comparing a submitted biometric sample against some or all enrolled reference templates to determine an individual's identity. In some arrangements, the SBEST processing system may require that a user first enrolls in a biometric system to generate a biometric reference template that can be used for subsequent biometric matching to verify the user's identity via a biometric sample acquired from the user. In other arrangements, the SBEST processing system may generate a biometric reference template from the user-provided biometric sample so that the user can be enrolled in a biometric systems for subsequent biometric authentication or identification.

In some arrangements, the SBEST processing system is used to store an SBEST or the components of an SBEST in a storage location within a remote procedure call ("RPC") or smart contract code (e.g., the SBEST wrapped in executable code, or within reach of, or access by some code) to aid in the transfer of value. When the contract conditions are met, the SBEST is transmitted to someone, some entity, or some location. Expanding generally, a smart contract is legal prose, executable code, and parameter(s) that must be achieved to execute the smart contract. The parameters vary by contract instance, such as terms, amounts, dates, etc., and the executable would be initiated upon achievement of one or more of the parameters (as dictated by the legal contract). Utilizing the SBEST processing system, an SBEST (e.g., signcrypted) may be wrapped in some executable code as part of a smart contract and stored in a distributed ledger, blockchain, or similar storage location. Alternatively, a signcrypting party may provide their biometric sample attached to a record along with an ACCEPT indicator. For example, the ACCEPT indicator may be stored as an attribute 36 or unsigned attributes 32 in an SBEST 30 message similar to the one described below in FIG. 2. These components are wrapped in some executable code and stored in a distributed ledger, blockchain, or similar storage location. When the contract conditions are met, the record and biometric sample are simultaneously signed and encrypted, generating an SBEST. In both arrangements, the SBEST can be stored and subsequently retrieved on a distributed ledger or blockchain, or the SBEST may be transmitted to an entity to complete the contract. For example, using the implementation described above, a signcrypting party sets up a recurring payment (bill, subscription service, mortgage, etc.) and insert an SBEST (or the components of an SBEST) in the payment smart contract stored on a distributed ledger. On the 1$^{st}$ day of each month for 10 years, the smart contract code is initiated such that the SBEST is compiled, signcrypted, and sent off to the appropriate entity. This process causes a transfer of value from some account of the signcrypting party to payment recipient's account. Alternatively, this implementation could be used to preauthorize the sale of stock or the purchase of stock on condition that the stock price falls to or below some designated amount.

The SBEST processing system provides technical solutions to computer-centric and internet-centric problems associated with conventional authentication systems. First, the SBEST processing system achieves data confidentiality and origin authenticity simultaneously by combining public-key encryption and digital signatures and offers better overall performance and security over sign-then-encrypt schemes. SBESTs provide shorter ciphertext and/or lower computational cost, making it ideal for protecting biometrics in environments with bandwidth limitations (e.g., wireless mobile devices), high volumes of transactions (e.g., Internet commerce), or size or cost of storage issues (e.g., smart cards). SBEST is a form of asymmetric cryptography that makes use of convenient symmetric techniques to remove some of the problems (e.g., trying to process long messages quickly) inherent in traditional asymmetric cryptosystems. Specifically, SBEST requires only a single key pair for each communicating party, while traditional sign-then-encrypt schemes (e.g., as defined in the X9.84 biometric information security management standard) require two key pairs for each communicating party. With this approach, message processing performance is improved, there are fewer keys to manage, and the need to establish a shared secret with a relying party is eliminated. In addition, SBEST can provide non-repudiation services, which is not possible in current systems.

SBEST also provides the high-level cryptographic key protection required to support various biometric matching operations, such as those of the United States Department of Defense ("DoD") Defense Forensics and Biometrics Agency (DFBA), while meeting the performance demands of biometric collection devices in the mobile environment. Through SBEST, the Elliptic Curve Pintsov-Vanstone Signature Scheme can be implemented, to provide security for bandwidth/computational resource limited Regular Ground Nodes. Additionally, SBEST is capable of providing sufficient security for a variety of security tiers while preventing the network from being overloaded due to the unnecessary cryptographic operations.

Further, the methods and systems described herein alleviate the strain on processing power and memory components currently required to manage, store, and authenticate the biometric sample of a message signer. The SBEST processing system provides a way for secure applications in a single cryptographic function to integrate encryption and signature schemes in an efficient way without sacrificing each scheme's security. Accordingly, the coupling of the signcrypting party's biometric sample with the signcrypting party's public-private key pair makes unauthorized replay (e.g., impersonation) of the signcrypting party's biometric sample incredibly difficult, as a unauthorized party would need both a biometric sample from the signcrypting party and the signcrypting party's private key. In some embodiments, the SBEST processing system utilizes a signed attributes feature to provide for an easy and lightweight mechanism to bind additional information to biometric sample and content. The SBEST processing system's use of additional attributes avoids complicating certificate issuance and management of processes by allowing the signcrypting party to add this information regarding certificate extension payload as a signed attribute. The ability to add attributes of any kind or any format makes SBEST a very flexible and adaptable electronic signature mechanism. Accordingly, an SBEST and the SBEST processing system can be easily adapted to support new business applications and security requirements. Additionally, making use of a TST from a TSA enables a relying party to determine when an SBEST was generated and that it is "fresh" (e.g., that the sample is not from an unauthorized party re-using a biometric sample). SBEST protects the confidentiality of the signcrypting party's personally identifiable information and does not require the use of, or processing power to communicate and interact with, a tokenization service provider, either in-house or over a network.

These problems arise out of the use of computers and the Internet, because they involve processing power, bandwidth requirements, storage requirements, and information security, each of which is inherent to the use of computers and the Internet. The problems also arise out of the use of computers and the internet, because online communications, transactions, and payment services, and the ability to properly authenticate a signcrypting party in an online communication, cannot exist without the use of computers and the Internet.

Referring to FIG. 1, a flow diagram of a method 10 of generating an SBEST is illustrated, according to an example embodiment. The method 10 involves binding and encrypting a record and biometric information of a signcrypting party, along with any additional information that the signcrypting party wants to provide, either under a signcryption or under a signature on signed attributes. For example, the signcrypting party can signcrypt the record and biometric sample and any additional information, or the signcrypting party can signcrypt just the record and biometric and then use signed attributes to add any additional information that does not require privacy protection. The method 10 may be performed by a back-end system. The signcrypting party provides a biometric sample, any additional content, the signcrypting party's public/private key pair, and the relying party's public key, and the SBEST processing system generates the signcrypted message. As will be appreciated, the method 10 may be performed using any of three component algorithms: a signcryption algorithm, a unsigncryption algorithm, and a key generation algorithm.

The method 10 is performed to enable the signcrypting party to "sign" a record (e.g., a contract, document, communication, etc.) by binding and encrypting the record with his or her biometric information under a digital signature.

At 20, the signcrypting party has previously enrolled a biometric reference template with a BSP. Enrollment is completed when the generated biometric reference template is associated with a signcrypting party identifier unique to the signcrypting party.

At 22, a biometric sample captured from the signcrypting party (e.g., user) is received. The sample could be captured using a biometric sensor or similar device (e.g., using a finger print scanner on a mobile computing device). In some arrangements, the captured biometric sample is first transmitted to a BSP to be processed into biometric data.

At 24, the relying party's public key of a public/private key pair associated with an asymmetric encryption system is retrieved. In some arrangements, the key pair is associated with a digital certificate in a public key infrastructure ("PKI"). In some arrangements, the relying party's public key information is retrieved from the authority that issued the key pair. In some arrangements, the relying party's public key is retrieved from a previous SBEST generated using the relying party's public key. In some arrangements, the relying party's public key is retrieved in response to a request for the relying party's public key transmitted from the signcrypting party to the relying party.

In some arrangements, a time stamp token ("TST") may be requested from a time stamp authority ("TSA"). In some embodiment, the TST is requested by generating a hash of the record and the biometric sample, which is used as an input to a trusted time stamp process. For example, in one embodiment, the hash is transmitted to a TSA, which cryptographically binds the hash to a time stamp to generate a TST. The TST can be subsequently included in the signcryption algorithm as the plaintext along with the record and biometric sample, provided along with an SBEST, or used in place of the record and biometric sample in the signcryption algorithm. In other arrangements, a non-trusted time stamp (e.g., local to the signcrypting party computing system) may be included.

At 26, the biometric sample and record are digitally signed and encrypted (e.g., signcrypted) to generate the SBEST. The process includes the use of a signcryption algorithm. The input for the signcryption algorithm of the SBEST includes: plaintext content (including at least the biometric sample), the signcrypting party's public and private key pair, and the relying party's public key. In some arrangements, the input also includes a label and an option. The plaintext, label, and resulting SBEST are all bit strings, whereas the public and private keys and the option are determined by the particular implementation of an SBEST mechanism (e.g., SBEST-content, SBEST-attributes, and SBEST-components modes).

The plaintext content includes the biometric sample to provide the "something-you-are" authentication factor. In some arrangements, the record is appended to or included with the biometric sample to further associate the record and the biometric sample. For example, the plaintext could include a loan agreement and the signer's biometric sample, thereby providing greater assurance to a relying party on the identity of the message signer and as an indication of acceptance of the signcrypted record than traditional digital signature methods alone.

The digital signature process is also referred to as signing the message digest. Generally, the message digest are hash numbers (e.g., algorithmic numbers) that represent the specific files (e.g., protected works) in an SBEST that are digitally signed. One message digest is assigned to particular data content such that a change to any of the specific files will be reflected in the message digest. In some arrangements, the message digest includes a direct signature that does not first hash the information to be protected before signing the content. In some arrangements, a signature key that includes a set of private data elements specific to an entity and usable only by this entity in the signature process may be used for the digital signature process.

The input to the key generation algorithm and the structure of public and private keys are dependent on the particular signcryption mechanism used and may also involve hybrid cryptography that couples asymmetric and symmetric cryptographic techniques. In some arrangements, the SBEST processing system utilizes symmetric key generation, such that the same secret key (e.g., a key pair shared by the signcrypting party and recipient) is used for both the signcrypting party's and the recipient's transformation of the information. In other arrangements, the SBEST processing system utilizes an asymmetric encryption system such that a public transformation (e.g., a public key) is used for encryption and whose private transformation (e.g., a private key) is used for decryption. In those arrangements, the signcrypting party's public and private key may be a part of an asymmetric encryption system and are associated with a PKI issued through a certificate authority ("CA"). In some embodiments, the public/private key pair is associated with a digital certificate in a PKI, for example, the X.509 certificate. In those embodiments, a key pair is generated (the private/public key pair must be generated together as they are mathematically related), the private key signs the public key, and the pair is summited to the CA or a front-end registration authority that will then generate that public key certificate. Alternatively, the private/public key pair could be issued with a commercial CA, for example, one associated with a financial institution. In some arrangements, a public key certificate is retrieved from the commercial CA and the certificate is used to ascertain the public/private key pair. In other embodiments, the key is an ephemeral public/private key pair not associated with a digital certificate in a PKI. In these embodiments, the public key can be included in the attributes or fields of an SBEST, allowing a digital signature verifier to use the included public key component to verify message integrity. In these arrangements, the verifier will be able to verify message integrity (e.g., that it has not been modified), but will not gain origin authenticity assurance (e.g., know who signed the message and who possessed the private key component of the key pair).

The label is a bit string that participates in the signcryption of a plaintext, but need not be protected for confidentiality. An example of a label is a string of public data that is either explicit or implicit from context and required to be bound to an SBEST. The length of a label may be variable, upper bounded only by an implementation dependent parameter. The same label is required to be used by both the signcryption and unsigncryption algorithm phases in order for a relying party to correctly unsigncrypt an SBEST. In some arrangements, the label is an empty field.

The option is an input argument that passes application and mechanism specific information to signcryption and unsigncryption algorithms. While information transmitted by an option may be used in signcryption or unsigncryption, the option itself is not directly involved in the signcryption or unsigncryption process. As an example, the elliptic curve based signcryption mechanism defined in this International Standard ISO IEC 29150-2011 may use an option to indicate the desired format for encoding points on an elliptic curve. A second possible use of options is to pass system wide parameters specific to the signcryption mechanism. A third possible use of option is to pass application or mechanism specific information, such as private factors of composite moduli, to aid faster signcryption or unsigncryption. Unlike the label, the option used by the unsigncryption algorithm of the relying party may be different from an option used by the unsigncryption algorithm. In some arrangements, the option is an empty field.

On the back-end, the SBEST processing system executes a series of calculations to generate an SBEST. Generally, this process includes generating a random prime number P of length $l_p$ and a random prime number Q of length $l_p$ such that Q is a prime factor of P−1. Subsequently, a random integer (U) from a series of [1, ..., Q−1] is generated. A first value, $F_1$, is determined using a modulus function with the relying party's public key, the random number U, and the random prime number P. A second value, $F_2$, is determined using a key derivation function and a broad support package ("BSP") in tandem with the inputs of $F_1$, the bit length of P, and the plaintext content. A third value, $F_3$, is determined using a hash function and a BSP in tandem with the inputs of $F_1$, the signcrypting party's public and private key pair, the bit length of P, and the plaintext content. The third, $F_3$, further altered using a BSP with the inputs of $F_3$ and the bit length of Q. A fourth value, $F_4$, is determined using a BSP with the input of the bit length of Q and a modulus function with $_Q$, $_U$, $F_3$ and the signcrypting party's private key. An SBEST is equal to $(F_2\|F_3\|F_4)$.

At 28, the SBEST is generated and transmitted to the relying party. In some arrangements, the record (in a non-signcrypted form) is also included with the SBEST.

In some arrangements, the method 10 may be used to process biometric reference templates under an SBEST simultaneous signature and encryption method for secure storage in a database. In this use, the BSP receives a biometric data element that will be used to generate the biometric reference template. The biometric data element is simultaneously signed and encrypted with the public and private key of the enroller and a public key component of a public/private key pair of the BSP. The resulting SBEST contains the digitally signed and encrypted biometric data element and can only be unsigncrypted by the BSP. In some arrangements, the signing actions of the BSP and enrolling signcrypting party are swapped, such that the biometric data element is simultaneously signed and encrypted with the public and private key of the BSP and the public key component of the enrolling signcrypting party.

Figure 2:
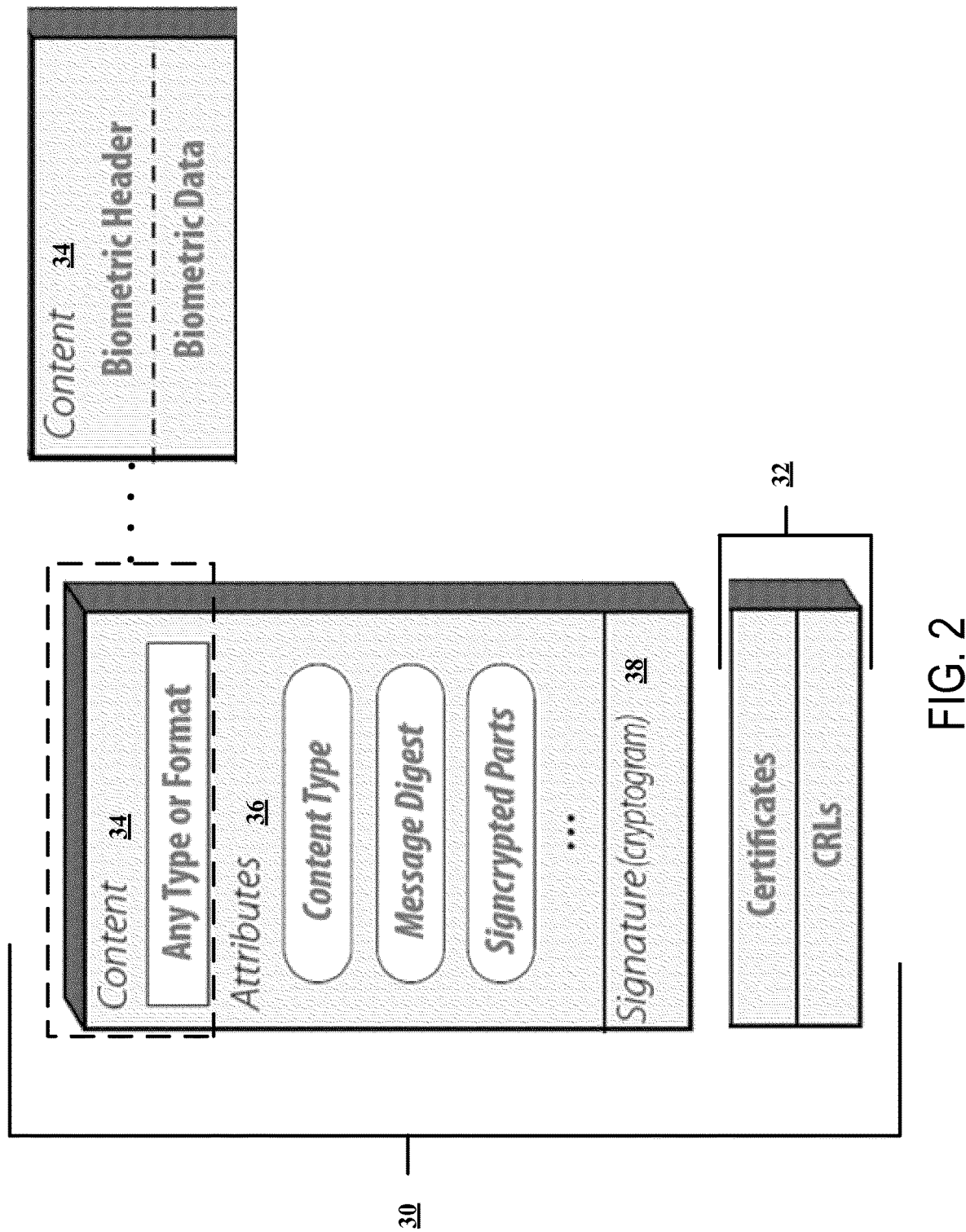
FIG. 2 is a block diagram of a signcrypted biometric electronic signature token, according to an example embodiment.

FIG. 2 is a block diagram of an SBEST 30, according to an example embodiment. The SBEST 30 may be one generated using the method 10 of FIG. 1. As shown in FIG. 2, the SBEST 30 includes content 34, attributes 36, a digital signature 38, and optional unsigned attributes 32. The SBEST 30 is the output by the signcryption algorithm that simultaneously signs and encrypts the plurality of inputs. As will be appreciated, if no additional unsigned attributes 32 are included in the SBEST 30, the SBEST 30 will just include the content 34 and attributes 36 under the digital signature 38.

Generally, the SBEST 30 may contain a set of per-message-recipient information to support multiple message recipients. Each element in the set provides a cryptogram and information for the entity whose public key is used to perform cryptographic operations. The message sender private key is used to sign the message, and the recipient public key and the sender public-private key pair are used to signcrypt. The message may include content of any type, and any number of associated attributes. The key pairs of the message signer and public key of the recipient are used to sign and signcrypt data. The sender identifies these two key pairs in either of the signed portion of the SBEST 30 or in the unsigned attributes 32 of the SBEST 30. Each key pair is typically associated with a public key identity certificate so that non-repudiation services are possible.

The content 34 includes at least a biometric data element captured from the signcrypting party. In some arrangements, the biometric data in the content 34 may include a biometric header that indicates the biometric type (e.g., iris, fingerprint, voice, etc.). The content 34 may also include a file type, record, image, or other content that is associated with the signcrypting party and the signcrypting party's biometric sample such as the hash of the signcrypting party's X.509 certificate. If attributes 36 are to be present, the "content type" and "message digest" will also be present. Any number of attributes 36 of any type or format can be bound to the content by the digital signature 38, for example an identifier of a BSP that maintains a biometric reference template for the signcrypting party. The digital signature 38 can include a PKI, a digital signing factor, or a signature key (e.g., a key that includes a set of private data elements specific to the signcrypting party).

Various embodiments utilize any of several modes to generate the SBEST 30, including an SBEST-content mode, an SBEST-attributes mode, and an SBEST-components mode. In the SBEST-content mode, data content of any type is signcrypted. In the SBEST-attributes mode, data content and associated attributes of any type or format are signcrypted. In the SBEST-components mode, components of the data content of any type are signcrypted, and then the resulting content is signed along with a set of associated attributes. This mode allows a biometric object containing signcrypted components to be cryptographically bound together with a set of security attributes using a digital signature. As will be appreciated, the record is also bound to the signed attributes, thereby providing an indicator of acceptance of the record content that is in compliance with a "valid e-signature" under law.

In the SBEST-content mode, content of any type or format is signcrypted using the signcryption algorithm, which the message signer applies to signcrypt the content using the public and private keys of the sender and the public key of the recipient. These keys are identified in the message along with the signcryption results. The plaintext content is not carried in a component of SBEST-content, only the signcrypted content is available to the message recipient. The recipient uses the provided signcryption algorithm, the public key of the sender, and their own public-private key pair to verify the signature and recover the plaintext from the message. In other words, the signcryption algorithm takes as input a plaintext content, a sender's public and private key pair, a recipient's public key and other data, outputs a ciphertext (e.g., the SBEST 30) after performing a sequence of specified operations on the input. The message recipient (whose public key was used as an input) uses the unsigncryption algorithm of the SBEST 30 to retrieve the plaintext. The unsigncryption algorithm has inputs of the received SBEST 30, the recipient's public and private key pair, a sender's public key and any other data, outputting a pair consisting of either a symbolic value ACCEPT and a plaintext, or a symbolic value REJECT and the null string.

In the SBEST-attributes mode, content of any type or format is signcrypted together with any number of attributes of any type or format. For the SBEST-attributes mode, the result of concatenating the attributes to the content is signcrypted by the sender. The signcryption process for the SBEST-attributes is the same as the signcryption process for the SBEST-content mode; the message signer applies this algorithm to signcrypt the content using the public and private keys of the sender and the public key of the recipient. The plaintext content and attributes are not included in the message. However, with the SBEST-attribute mode, there is a value of a type for attributes that are to be signcrypted with the content and placed in the signature component of the SBEST. The SBEST-attribute mode can contain an optional attributes component type that is not included in the signcrypted message.

In the SBEST-components mode, components of content of any type or format are signcrypted as described for the signcrypted-content mode. The resulting content containing signcrypted components together with at least two required attributes (e.g., the Message Digest and Content Type) are then signed following the processing requirements for the signcrypted data. A list of signcrypted components must be included in the signed attributes to ensure they are bound to the content under a digital signature and available to the intended message recipient. In some arrangements, an attribute ("Signcrypted Parts") is designated and must be included in the signed attributes, to ensure that the attribute is bound to the content under the digital signature. The Signcrypted Parts attribute carries a value of an Abstract Syntax Notation One ("ASN.1") Open Type that is based on a parameterized type of manifest, where the manifest sets the elements in the information object that constrains the components of the Signcrypted Parts attribute. Any number of objects can be added to the manifest object set, and these can be used to locate signcrypted components in any document or file of any type. In some arrangements, a manifest attribute is utilized which indicates that the entire content is signcrypted in signcrypted-components mode, and any attributes are signed and bound to the signcrypted content. These bound attributes are present in the message, but they are not signcrypted.

With any of the SBEST 30 modes, a list of signcrypted components can be carried in a signed attribute. The format and the information contained in the list varies with the type of content. XML Path ("XPath") expressions can be used to locate any signcrypted element in any XML-instance document. To identify the signcrypted components in an XML-instance document, a set of XPath expressions can be used to identify the location of each signcrypted element. When the contents of an XML element are signcrypted, the sender includes the outer markup tags in the signcryption operation. These outer tags are not removed from the document, since they are used to locate the element using)(Path. The markup between these outer tags is replaced with a character string representation of the signcryption results (e.g., a value of XML type base64Binary). This XML type may be used to represent arbitrary Base64-encoded binary data. A message recipient uses the list of XPath expressions to locate the tags in an XML-instance document that contains signcrypted data. The signature on each signcrypted object can then be verified and its plaintext content recovered. The recovered plaintext can then be used to replace the cryptogram with the recovered XML markup prior to XML schema validation. For example, one element could be of a type "XPath" and is used to locate any signcrypted element in any XML instance document, or an element in a financial transaction based on the ISO 20022 Universal Financial Industry message scheme. This is beneficial for instances where the contents of an XML element are signcrypted and the sender includes the outer markup tags in the signcryption.

In addition to the variety of SBEST 30 modes, the SBEST 30 includes unsigned attributes 32 in certain embodiments. In addition to the unsigned attributes 32 can include, for example, optional certificates and certificate revocation lists ("CRLs") that may be sent along with the SBEST 30 or included in the content 34 or attributes 36 under the digital signature 38.

Figure 3:
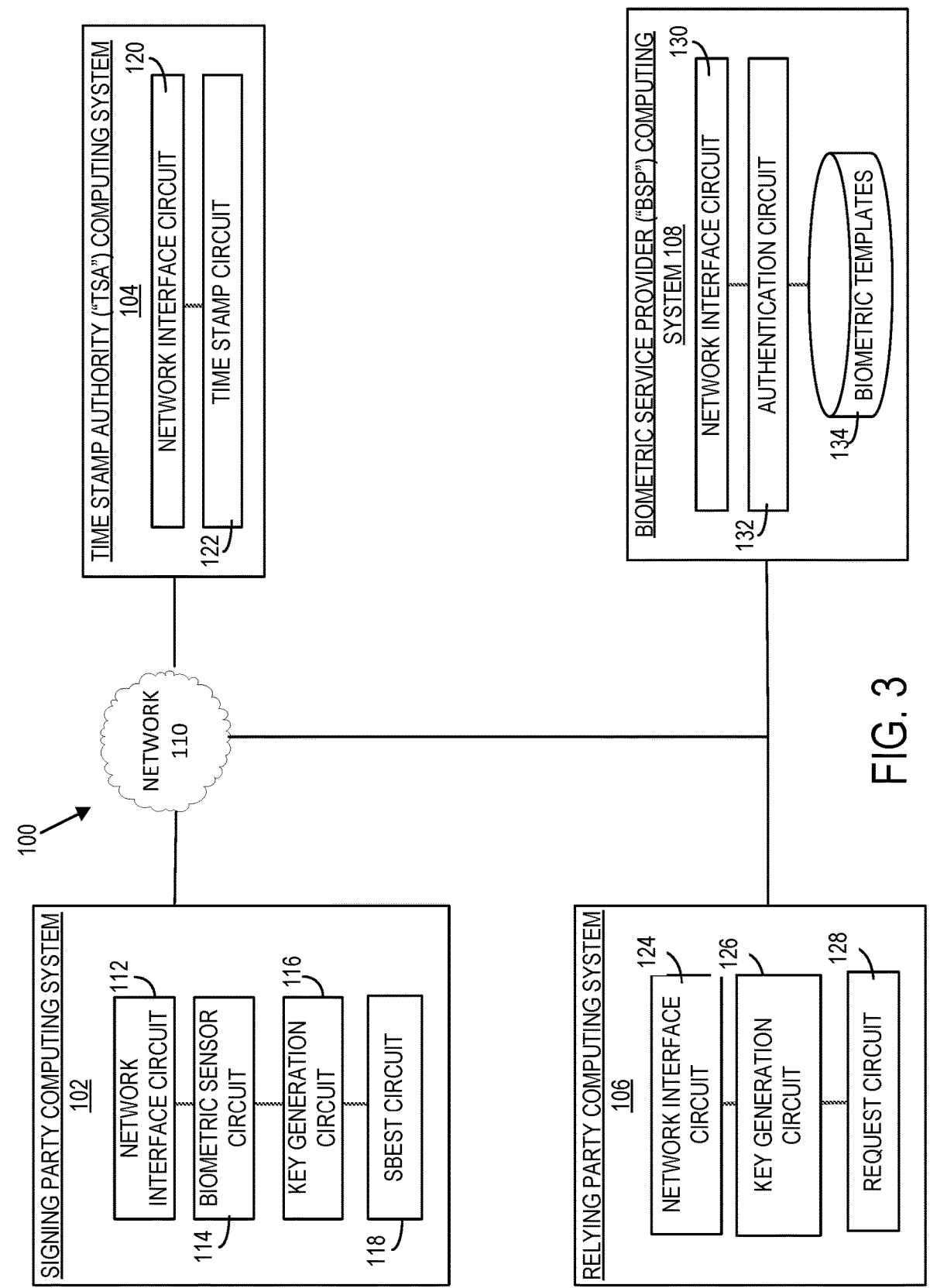
FIG. 3 is a schematic diagram of a signcrypted biometric electronic signature token processing system, according to an example embodiment.

FIG. 3 is a schematic diagram of the SBEST processing system 100, according to an example embodiment. The SBEST processing system 100 includes a signcrypting party (e.g., message signer) computing system 102, a TSA computing system 104, a relying party (e.g., recipient) computing system 106, and a BSP computing system 108. Each of the signcrypting party computing system 102, the TSA computing system 104, the relying party (e.g., recipient) computing system 106, and the BSP computing system 108 is in operative communication with the other via a network 110. The mechanisms allow for the generation and verification of the identity of a signer of an electronic message via a biometric sample and key pair. Specifically, the SBEST processing system 100 makes it possible for the identity of the signer to be verified by a relying party (e.g., merchant, financial institution, service provider, etc.) by simultaneously encrypting and signing a biometric sample, additional content and attributes that facilitate the verification of the message signer (e.g., signcrypting party). The network 110 may include, for example, the Internet, cellular networks, proprietary cloud networks, telebiometric objects on the internet of things, and the like.

The signcrypting party computing system 102 includes a network interface circuit 112, a biometric sensor circuit 114, a key generation circuit 116, and an SBEST circuit 118. The network interface circuit 112 is structured to facilitate operative communication between the signcrypting party computing system 102 and other systems and devices over the network 110. The signcrypting party computing system 102 may include smartphones, tablet computing systems, laptop computing systems, desktop computing systems, PDAs, smart watches, smart glasses, tablets, etc.

The biometric sensor 114 is structured to capture biometric data. For example, the sensor can be structured to read a fingerprint, voice print, or other biometric marker. Generally, the biometric sensor 114 is any technology type that supports the capture of biometric data. The biometric sensor 114 can be used to generate a biometric reference template or a biometric sample used for verification. In some arrangements, the raw biometric data captured by the biometric sensor 114 needs to be further processed by a BSP to generate a biometric reference template. In some arrangements, a plurality of biometric samples captured from an individual are processed to create the biometric reference template.

The key generation circuit 116 is structured to generate a public/private key pair for the digital signature and encryption of an SBEST. In some embodiments the public/private key pair is associated with a digital certificate in a PKI, for example, the X.509 certificate. In those embodiments, a key pair is generated (the private/public key pair must be generated together as they are mathematically related), the private key signs the public key, and the pair is summited to the CA or the front end registration authority that will then generate that public key certificate. Alternatively, the private/public key pair could be issued with a commercial CA, for example, one associated with a financial institution or using an internally generated self-signed certificate. In some arrangements, the signcrypting party computing system 102 retrieves a public key certificate from the commercial CA and uses the certificate to ascertain the public/private key pair. In other embodiments, the key generation circuit 116 generates an ephemeral public/private key pair not associated with a digital certificate in a PKI. In these embodiments, the public key can be included in the attributes or fields of an SBEST, allowing a digital signature verifier to use the included public key component to verify message integrity. In these arrangements, the verifier will be able to verify message integrity (e.g., that it has not been modified), but will not gain origin authenticity assurance (e.g., know who signed the message and who possessed the private key component of the key pair). In some arrangements, the key generation circuit 116 may be a part of the SBEST circuit 118.

The SBEST circuit 118 is structured to generate an SBEST by retrieving the private key from the key generation circuit 116 and simultaneously digitally signing (and therefore cryptographically binding) and encrypting the content, biometric sample, and additional attributes specified by the protocol or message signer. The SBEST circuit 118 manages the key generation circuit 116 and controls the generation of key pairs according to the desired SBEST (e.g., whether the key is associated with a PKI, CA, etc.). Additionally, the SBEST circuit 118 must retrieve the public key of the relying party computing system 106. This may include a request to the key generation circuit 126 of the relying party computing system 106. In other arrangements, the SBEST circuit 118 will look up the relying party's public key certificate registered with a CA. Once a key pair is generated and the relying party's public key retrieved, the SBEST circuit 118 determines additional content to be bound within an SBEST under the digital signature. The SBEST circuit 118 also determines what additional attributes or content go within an SBEST as unsigned attributes. The signed or unsigned attributes can include, for example, a transaction identifier, a message signer identifier, a system generated time stamp, a public key, a uniform resource identifier for the BSP capable of matching the biometric sample to a biometric reference template, and the like. In some arrangements, the identifier can be of a registered object (e.g., unique RFID, a telebiometric authentication identifier, etc.) allowing an additional authentication layer of "something-you-have." For example, the message signer wants to withdraw funds from an ATM, to validate the withdrawal the SBEST circuit 118 could include signed attributes of a financial institution identifier, an account number, a BSP identifier, and an ATM generated time stamp. The composition of an SBEST is expanded upon further in FIG. 2. An example method of generating an SBEST is described in greater detail above in method 10 of FIG. 1.

The TSA computing system 104 includes a network interface circuit 120 and a time stamp circuit 122. The TSA computing system 104 is managed by any trusted time authority that can provide a TST for a piece of information or data entry. The trusted time authority can be one that complies with the X9.95 standard, or those defined in similar standards by ISO/IEC, and satisfies legal and regulatory requirements. In some embodiments, the TSA computing system 104 may be contained in, and controlled by, the TSA computing system 104 or the BSP computing system 108. The network interface circuit 120 is structured to facilitate operative communication between the TSA computing system 104 and the signcrypting party computing system 102 over the network 110. The time stamp circuit 122 is structured to negotiate a trusted TST, which includes receiving a hash of a piece of information and generating a trusted TST for the information for future verification. In some arrangements, the TST is generated inter-device (e.g., capturing the system time, or mobile phone time) and the TST is stored as an attribute in an SBEST, either within the signcryption algorithm as an input or within an SBEST as an unsigned attribute that may have been previously signed.

The BSP computing system 108 includes a network interface circuit 130, an authentication circuit 132, and a biometric reference template (e.g., value) database 134. The network interface circuit 130 is structured to facilitate operative communication between the BSP computing system 108 and other systems and devices over the network 110. Generally, the BSP computing system 108 stores biometric reference templates for signing parties and handles biometric matching requests from relying parties. Before using the SBEST processing system 100, the signcrypting party must have enrolled with the BSP and created a biometric reference template. In some embodiments, the biometric sample may only be transmitted by an employee of the BSP entering the data into a computing system (e.g., an employee terminal connected to the server of the BSP) during a person-to-person interaction. For example, the customer may walk into a branch location of the BSP and initiate the enrollment process via interaction with a teller. In other arrangements, the SBEST processing system may create a biometric reference template from the user-provided biometric sample so that the user can be enrolled in a biometric systems for subsequent biometric authentication or identification.

The biometric reference template database 134 is a plurality of signcrypting party identifiers and corresponding biometric reference templates, which are a byproduct of the customer enrolling in the biometric service. The signcrypting party identifier can be, for example, a signcrypting party name, email address, phone number, or the actual name of the customer. The signcrypting party identifier may be stored in the attributes or fields of an SBEST.

The authentication circuit 132 is structured to receive a biometric sample and an authentication request from the relying party computing system 106 over the network 110 and compare the received sample to a stored reference template. The authentication request includes a request for verification and/or identification. Verification is the process of comparing a match template against a specific reference template based on a claimed identity (e.g., signcrypting party ID, account number). If the sample matches the reference template, the authentication circuit 132 transmits a positive authentication value to the relying party computing system 106. In some arrangements, the authentication circuit 132 will provide a negative matching value (e.g., indicator) if there is no matching signcrypting party identifier in the biometric reference template database 134 or if the signcrypting party does not have a biometric reference template for the biometric type of the biometric sample.

The relying party computing system 106 includes a network interface circuit 124, a key generation circuit 126, and a request circuit 128. Generally, the relying party computing system 106 receives an SBEST from the signcrypting party computing system 102 and verifies the identity of the message signer. With the received SBEST, the relying party computing system 106 is also able to verify data integrity, origin authenticity, and non-repudiation of the content within the SBEST and the SBEST as a whole. Specifically, if the biometric sample and biometric reference template produce a positive match value and the digital signature is verified, the relying party can trust the data integrity and origin authentication. Non-repudiation is achieved if each key pair is associated with a public key identity certificate. The network interface circuit 124 is structured to facilitate operative communication between the relying party computing system 106 and other systems and devices over the network 110.

The request circuit 128 is structured to facilitate the authentication of the biometric sample in an SBEST with a biometric reference template stored on the BSP computing system 108. In some arrangements, the request circuit 128 is similar to the SBEST circuit 118 of the signcrypting party computing system 102. In some arrangements, there is an application or web browser on the computing system that facilitates this process. For example, upon receiving an SBEST, the relying party computing system 106 automatically begins verification of the signature and unencrypts an SBEST, and transfers the captured biometric sample to the BSP computing system 108 for matching. The biometric sample can be in the form of a simple oblique value (a string of octets) or structured content that contains the biometric data value and any information needed to recover the plaintext, such as the URL address of a biometric service provider or web service, an indication of the specific biometric processing technique that was used, and any other required data or authentication information. In some arrangements, the attribute of the digital signature message may be cryptographically bound to a hash of the biometric sample. An example method 400 of verifying an SBEST is discussed below in FIG. 4.

Figure 4:
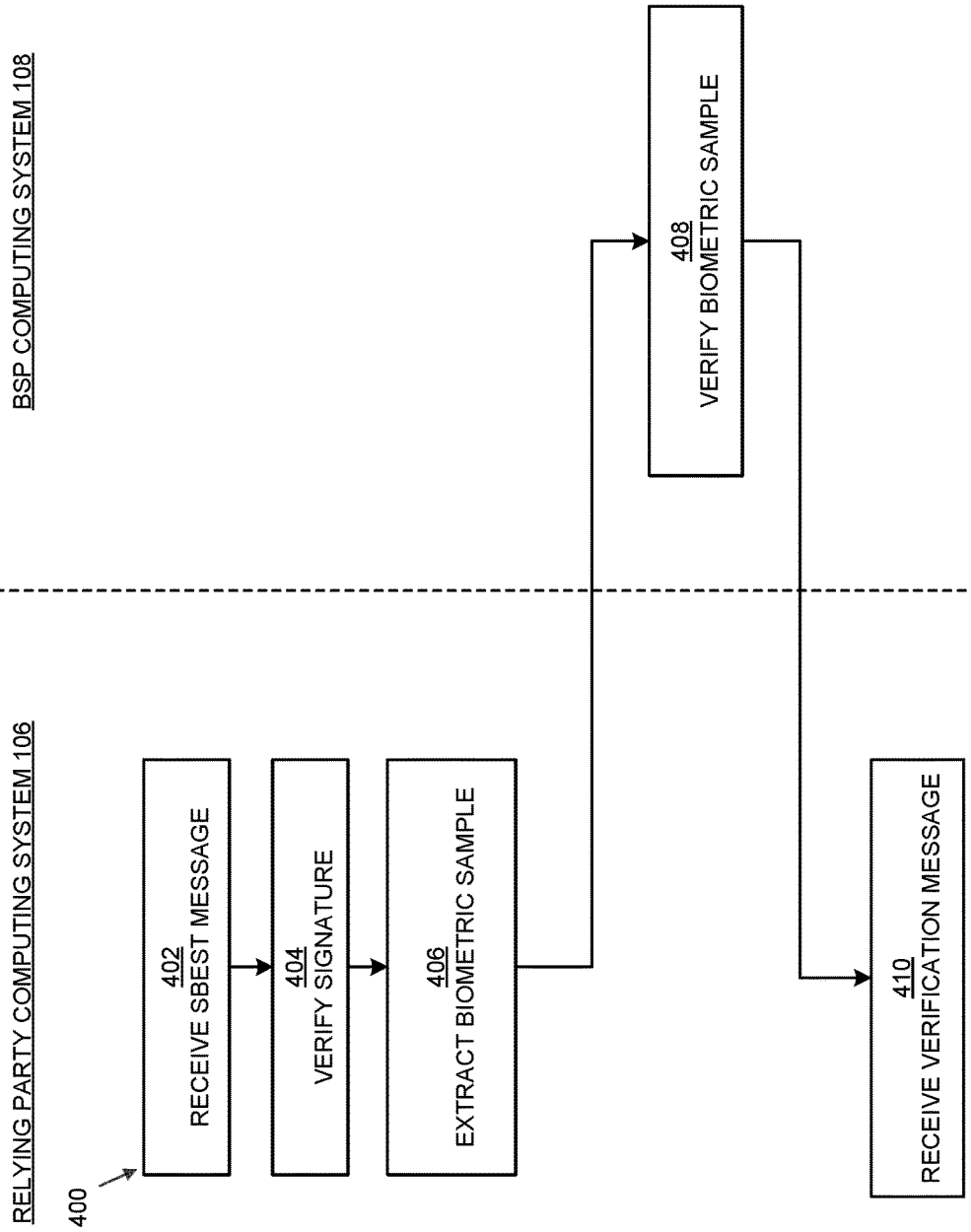
FIG. 4 is a flow diagram illustrating a method of validating a signcrypted biometric electronic signature token, according to an example embodiment.

Referring to FIG. 4, a flow diagram of a method 400 of validating an SBEST is illustrated, according to an example embodiment. The method 400 is described in connection with a relying party (e.g., message recipient) and a BSP. According to various embodiments, the relying party is an entity that manages the relying party computing system 106 of FIG. 3, and the BSP is an entity that manages the BSP computing system 108 of FIG. 3. However, the method 400 may be similarly performed by other systems and devices. The method 400 includes receiving an SBEST that provides the relying party with all information needed to verify the digital signature and biometric information of a signcrypting party included in the SBEST. The digital signature can subsequently be used to provide two-factor authentication via a "something-you-have" factor in the form of the user's private key, and a "something-you-are" factor in the form of the user's biometric sample. In some arrangements, a relaying party (e.g., middle party, merchant, etc.), that does not require the biometric matching capability, but is able to verify the signature on the SBEST and trust in some of the SBEST content, transmits the SBEST from the signcrypting party to the relying party. The relaying party may transmit the SBEST to the relying party computing system 106. For example, the relaying party may be a merchant that receives the SBEST from a credit card holder (e.g., message signer) and transmits the charge information to the relying party (e.g., payment card issuer).

The method 400 begins when the relying party computing system 106 receives an SBEST, at 402. At 404, the relying party computing system 106 verifies the digital signature. A relying party can verify the signature to provide the "something-you-have" authentication factor. In one embodiment, path validation is performed on the signer certificate chain back to a trust anchor. The relying party determines whether the message and signed message digest (the "digital signature") that was sent to the relying party is valid and trusted (e.g., that the signature itself is valid and that the certificates in the path are not on a revocation list). The recipient can apply the same hash function to the received message to produce a message digest. Using the public key of the sender, the recipient can attempt to verify the signed version of the message digest that the recipient has received from the sender. The verification procedure uses the sender's public key in a mathematical operation to determine whether the signature was indeed created from the same message digest using the correct private key. If the verification function is successful, the signed version of the message digest will be proven to have originated from the message digest that the recipient has produced by applying the hash function directly to the message. A successful verification operation therefore allows the recipient to confirm the true authorship of the message and to confirm that the message has not been altered. In some arrangements, an SBEST includes PKI, CRLs, CA, or similar information for the relying party computing system 106 to track the signature back to a trust anchor/entity. For example, the relying party computing system 106 verifies with the public or private service provider associated with the key pair used that the public key certificate is valid. In other arrangements, the relying party computing system 106 may use the signcrypting party's public key and the relying party's public and private key to verify the signature.

At 406, the relying party computing system 106 extracts the encrypted biometric sample. The relying party computing system uses an unsigncryption algorithm with the inputs of: the signcrypted biometric electronic signature token, recipient's private and public key pair, sender's public key, the label, and an option. In some arrangements, the resulting output includes a pair consisting of either a symbolic value "ACCEPT" and a plaintext, or a symbolic value "REJECT" and the null string. The same label is required to be used by both the signcryption (used by the signcrypting party computing system 102) and unsigncryption algorithms in order for a relying party to correctly unsigncrypt the SBEST. In some arrangements, the label is an empty field. Unlike the label, the option used by the unsigncryption algorithm of the relying party may be different from an option used by the unsigncryption algorithm. In some arrangements, the option is an empty field. The output, at 406, includes a pair consisting of either a symbolic value "ACCEPT" and a plaintext of the biometric sample, or a symbolic value "REJECT" and the null string.

At 408, the relying party computing system 106 transmits a biometric match request to the BSP computing system 108 and the BSP verifies the biometric sample. The verification is a "one-to-one" comparison that entails comparing a biometric match template generated from the transmitted/provided biometric sample and a previously generated reference template stored in a database of the BSP. Alternatively, the request, at 408, could be for an identification. Identification is the process of comparing a submitted biometric sample against some or all enrolled reference templates to determine an individual's identity. Identification is a "one-to-many" comparison that entails the comparison of a match template generated from a newly captured sample with all of the templates in the database. It is most often used to determine whether or not a person has previously enrolled in the system. It should be understood that embodiments described herein are not limited to providing biometric authentication of a message signer and content. Instead, the embodiments described herein may similarly be performed on other types of systems using other types of data.

At 410, the BSP computing system 108 transmits the match value to the relying party computing system 106. For example, the match value is a binary value indicating a match or a non-match. If the match value is positive and the digital signature is verified, the relying party can trust the data integrity and origin authentication of the biometric sample, content, and attributes of the SBEST and the SBEST as a whole. In some arrangements that include a TST, the relying party can also verify a TST associated with an SBEST by completing a "hash check" with the information. This process includes generating a hash of the original data, appending the timestamp given by the TSA, and calculating the hash of the result (e.g., the hash of the original data with the appended time stamp).

Figure 5:
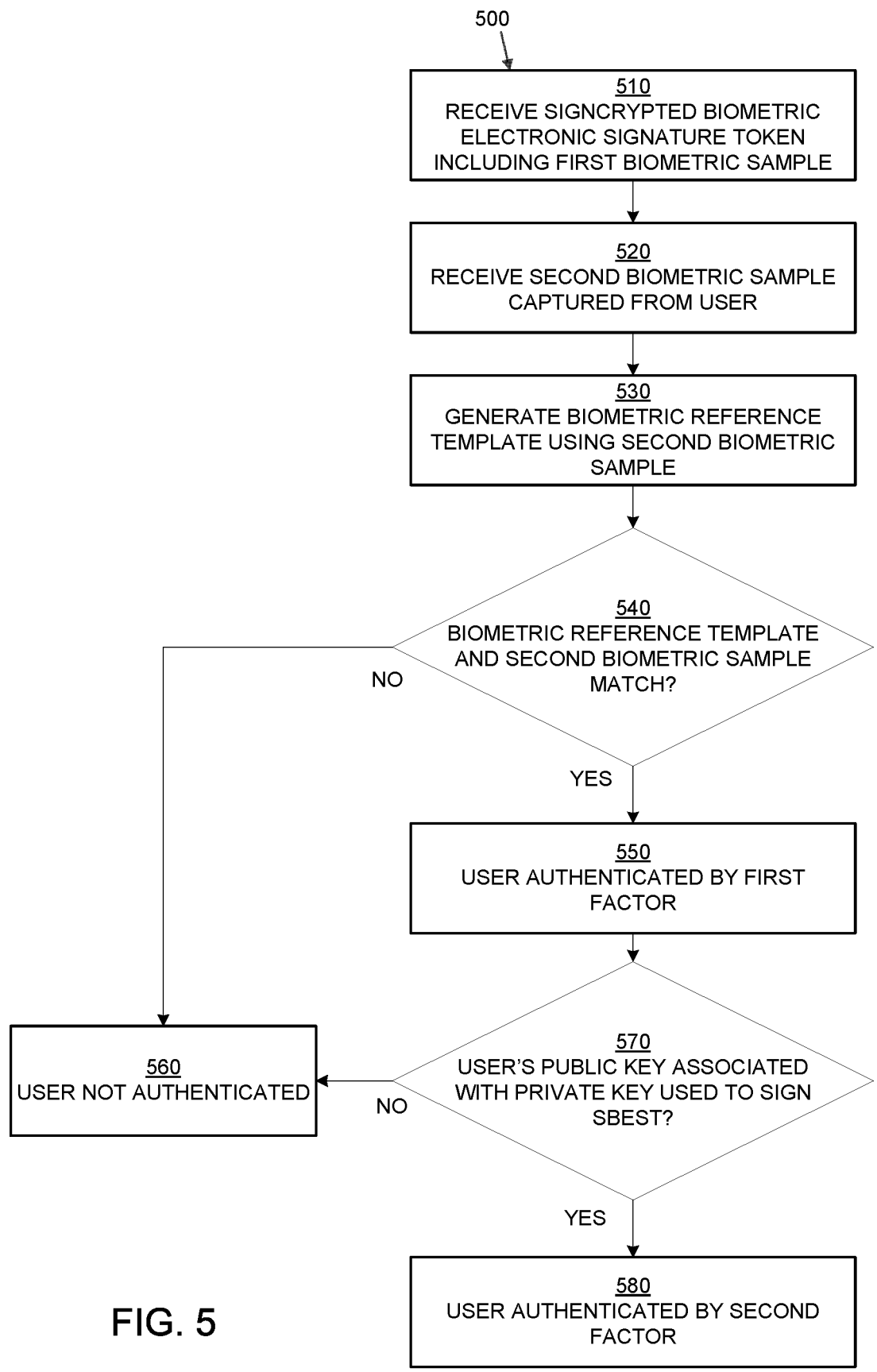
FIG. 5 is a flow diagram illustrating a method of verifying the identity of a signcrypting party without signcrypting party previously enrolling with a BSP, according to an example embodiment.

FIG. 5 is a flow diagram illustrating a method 500 of verifying the identity of a signcrypting party that has generated an SBEST without the signcrypting party previously enrolling with a BSP, according to an example embodiment. According to various embodiments, the method 500 may be performed by an independent third party to authenticate the user purporting to have biometrically signed the SBEST using a second biometric sample captured from the user. This provides a first authentication factor that the user is the signcrypting party. In some embodiments, the method 500 includes authenticating the user via a second authentication factor by verifying that the owner of the private key used to generate the SBEST (the signcrypting party) is the individual identified in the decrypted biometric sample included in the SBEST.

At 510, an SBEST is received. According to various embodiments, the SBEST comprises a message including a first biometric sample captured from a signcrypting party and a record. The message has simultaneously digitally signed and encrypted with a public and private key associated with the signcrypting party and a public key associated with a relying party.

At 520, a second biometric sample is received. The second biometric sample has been captured from a user purporting to be the signcrypting party that biometrically signed the SBEST with the first biometric sample captured from the signcrypting party.

At 530, a biometric reference template is generated based on biometric characteristics extracted from the second biometric sample. In some arrangements, the generation of the biometric reference template can be done by an another party, for example, a BSP.

At 540, it is determined whether the biometric reference template generated at 530 using the second biometric sample is matched against the first biometric sample in the SBEST. In some arrangements, a biometric matching service it utilized to complete the match. If the result of 540 is "YES" and the biometric reference template and the first biometric sample match, then the user is authenticated by a first authentication factor at 550. This verifies that the user is the signcrypting party. If the result of 540 is "NO" and the biometric reference template and the first biometric sample do not match, then the user is not authenticated at 560.

At 570, it is determined whether a public key associated with the user is part of a key pair including the private key used to digitally sign the message to generate the SBEST. This verifies that the owner of the private key used to generate the SBEST (the signcrypting party) is the individual identified in the decrypted biometric sample included in the SBEST. If the result of 570 is "YES," then the user is authenticated by a second authentication factor at 580. If the result of 570 is "NO," then the user is not authenticated at 560. According to various embodiments, authentication may be performed using either of 540 and 570, or both of 540 and 570.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for".

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor that, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data that cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, video and audio recording devices, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed:

1. A method, comprising:
receiving, by a computing system, a biometric sample captured from a signcrypting party and a record;
receiving, by the computing system and from the signcrypting party, an accept indicator with the biometric sample, the accept indicator including an executing condition, the accept indicator demonstrating that the signcrypting party accepts the record, the executing condition associated with the record and indicative of a condition that is met and causes the acceptance of the record by the signcrypting party;
storing, by the computing system, the biometric sample, the record, and the accept indicator, wrapped in a signcrypt code in a storage location;
initiating, by the computing system, the signcrypt code when the executing condition is achieved;
generating, by the computing system, a first hash on the biometric sample and the record;
retrieving, by the computing system, a time stamp token, the time stamp token including the first hash cryptographically bound to a time stamp; and
signcrypting, by the computing system, each of the record and the biometric sample using each of a signcrypting party public/private key pair associated with the signcrypting party, and a recipient public key of a recipient public/private key pair in generating a signcrypted biometric electronic signature token ("SBEST"), wherein an identifier of a service provider that has a biometric reference template associated with the signcrypting party is bound to the SBEST,
wherein a digital signature of the SBEST can be verified using each of the recipient public/private key pair and the signcrypting party public key,
wherein the time stamp token may be subsequently validated by verifying that the time stamp token was generated using the first hash, and
wherein acceptance of the record by the signcrypting party is verified by matching the biometric sample recovered from the SBEST with the biometric reference template associated with the signcrypting party at the service provider indicated in the identifier bound to the SBEST.

2. The method of claim 1, further comprising:
generating, by the computing system, a first attribute, the first attribute comprising a first component of at least one of a record and the biometric sample and a second component comprising a value of an Abstract Syntax Notation One Open Type associated with a manifest object set, the manifest object set comprising at least one element that constrains the first component, the manifest object set configured to locate signcrypted components associated with the record.

3. The method of claim 2, wherein signcrypting party's identity is authenticated by:
extracting, by a recipient computing system, the biometric sample from the SBEST, wherein extracting includes:
decrypting, by the recipient computing system, the signcrypted record and biometric sample using an unsigncryption algorithm using each of the recipient public key, the recipient private key, and the signcrypting party public key;

matching, by the recipient computing system, the biometric sample to a biometric reference template associated with a registered identity; and verifying, by the recipient computing system, that the registered identity matches the signcrypting party.

4. The method of claim 2, wherein the record and the biometric sample are signcrypted using a signcrypted-content mode in generating the SBEST, wherein the SBEST includes a third component identifying a signcryption algorithm and associated parameters used to signcrypted the record and the biometric sample.

5. The method of claim 2, wherein the record and biometric sample are signcrypted using a signcrypted-attributes mode in generating the SBEST, wherein the signcrypted-attributes mode comprises:

signcrypting a second attribute in connection with signcrypting the record and the biometric sample;

concatenating an encoding of the second attribute to signcrypted record, biometric sample, and second attribute in generating concatenated encoded content; and signcrypting the concatenated encoded content.

6. The method of claim 5, wherein the second attribute is a signcrypting party identifier, wherein the signcrypting party identifier is at least one of: a signcrypting party account number, or a unique signcrypting party identifier.

7. The method of claim 2, wherein signcrypting includes using a signature key, wherein the signature key includes a set of private data elements specific to the signcrypting party and is usable only by the signcrypting party in the signature process.

8. The method of claim 2, wherein the signcrypting party public/private key pair is associated with an X.509 certificate in a public key infrastructure.

9. The method of claim 2, wherein the manifest object set configured to locate signcrypted components associated with the record via XML Path ("XPath") expressions.

10. The method of claim 1, wherein the time stamp token is a trusted time stamp token.

11. The method of claim 1, wherein verification of the digital signature is determined by:

verifying that the signcrypting party public key is associated with the signcrypting party;

verifying that the time stamp token was signed with the signcrypting party public key;

generating a second hash on the biometric sample and the record; and verifying that the time stamp token was generated using the second hash.

12. The method of claim 11, wherein verifying that the signcrypting party public key is associated with the signcrypting party includes validating a digital certificate associated with the signcrypting party public key, the validation comprising transmitting a validation request to a certificate authority that has registered the signcrypting party public key.

13. A system, comprising:

a storage location comprising a plurality of biometric reference templates;

a computing system, the computing system comprising a processor and instructions stored in non-transitory machine-readable media, the instructions configured to cause the computing system to:

receive a biometric sample from a signcrypting party;

generate a first attribute, the first attribute comprising a first component of at least one of a record and the biometric sample and a second component comprising a value of an Abstract Syntax Notation One Open Type associated with a manifest object set, the manifest object set comprising at least one element that constrains the first component, the manifest object set configured to locate signcrypted components associated with the record;

receive, from the signcrypting party, an accept indicator with the biometric sample, the accept indicator including an executing condition, the accept indicator demonstrating that the signcrypting party accepts the record, the executing condition associated with the record and indicative of a condition that is met and causes the acceptance of the record by the signcrypting party;

store the biometric sample, the record, and the accept indicator, wrapped in a signcrypt code on a distributed ledger;

initiate the signcrypt code when the executing condition is achieved;

generate a first hash on the biometric sample and the record;

retrieve a time stamp token, the time stamp token including the first hash cryptographically bound to a time stamp; and signcrypt each of a record and the biometric sample using each of a signcrypting party public/private key pair associated with the signcrypting party, and a recipient public key of a recipient public/private key pair in generating a signcrypted biometric electronic signature token ("SBEST"), the first attribute included in a signed attribute of the SBEST and bound under a digital signature, and wherein an identifier of a service provider that has a biometric reference template associated with the signcrypting party is bound to the SBEST, wherein a digital signature of the SBEST can be verified using each of the recipient public/private key pair and the signcrypting party public key, wherein the time stamp token may be subsequently validated by verifying that the time stamp token was generated using the first hash, and wherein acceptance of the record by the signcrypting party is verified by matching the biometric sample recovered from the SBEST with the biometric reference template associated with the signcrypting party at the service provider indicated in the identifier bound to the SBEST.

14. The system of claim 13, wherein the time stamp token is a trusted time stamp token.

15. The system of claim 13, wherein verification of the digital signature is determined by:

verifying that the signcrypting party public key is associated with the signcrypting party;

verifying that the time stamp token was signed with the signcrypting party public key;

generating a second hash on the biometric sample and the record; and verifying that the time stamp token was generated using the second hash.

16. The system of claim 15, wherein verifying that the signcrypting party public key is associated with the signcrypting party includes validating a digital certificate associated with the signcrypting party public key, the validation comprising transmitting a validation request to a certificate authority that has registered the signcrypting party public key.

17. The system of claim 13, wherein signcrypting party's identity is authenticated by:
    extracting, by a recipient computing system, the biometric sample from the SBEST, wherein extracting includes:
        decrypting, by the recipient computing system, the signcrypted record and biometric sample using an unsigncryption algorithm using each of the recipient public key, the recipient private key, and the signcrypting party public key;
        matching, by the recipient computing system, the biometric sample to a biometric reference template associated with a registered identity; and
        verifying, by the recipient computing system, that the registered identity matches the signcrypting party.

18. The system of claim 13, wherein the record and the biometric sample are signcrypted using a signcrypted-content mode in generating the SBEST, wherein the SBEST includes a third component identifying a signcryption algorithm and associated parameters used to signcrypted the record and the biometric sample.

19. The system of claim 13, wherein the record and biometric sample are signcrypted using a signcrypted-attributes mode in generating the SBEST, wherein the signcrypted-attributes mode comprises:
    signcrypting a second attribute in connection with signcrypting the record and the biometric sample;
    concatenating an encoding of the second attribute to signcrypted record, biometric sample, and second attribute in generating concatenated encoded content; and
    signcrypting the concatenated encoded content.

20. The system of claim 19, wherein the second attribute is a signcrypting party identifier, wherein the signcrypting party identifier is at least one of: a signcrypting party account number, or a unique signcrypting party identifier.

21. The system of claim 13, wherein signcrypting includes using a signature key, wherein the signature key includes a set of private data elements specific to the signcrypting party and is usable only by the signcrypting party in the signature process.

22. The system of claim 13, wherein the signcrypting party public/private key pair is associated with an X.509 certificate in a public key infrastructure.

* * * * *